(12) United States Patent
Jaradi et al.

(10) Patent No.: US 12,441,272 B2
(45) Date of Patent: Oct. 14, 2025

(54) LOAD LIMITING SEATBELT RETRACTOR

(71) Applicant: Ford Global Technologies, LLC, Dearborn, MI (US)

(72) Inventors: Dean M. Jaradi, Macomb, MI (US); Mohammad Omar Faruque, Ann Arbor, MI (US); S.M. Iskander Farooq, Novi, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 291 days.

(21) Appl. No.: 18/047,746

(22) Filed: Oct. 19, 2022

(65) Prior Publication Data

US 2024/0132013 A1 Apr. 25, 2024
US 2024/0227724 A9 Jul. 11, 2024

(51) Int. Cl.
*B60R 22/38* (2006.01)
*B60R 22/28* (2006.01)
*B60R 22/34* (2006.01)
*B60R 22/405* (2006.01)
*B60R 22/46* (2006.01)

(52) U.S. Cl.
CPC ........ *B60R 22/38* (2013.01); *B60R 2022/287* (2013.01); *B60R 2022/3421* (2013.01); *B60R 22/405* (2013.01); *B60R 22/4676* (2013.01)

(58) Field of Classification Search
CPC .............. B60R 2022/287; B60R 22/00; B60R 2022/289; B60R 22/3413; B60R 22/38; B60R 22/405; B60R 22/4676; B60R 2022/3421
See application file for complete search history.

(56) References Cited

U.S. PATENT DOCUMENTS

| | | | |
|---|---|---|---|
| 5,794,876 A * | 8/1998 | Morizane | B60R 22/4633 242/374 |
| 5,967,442 A * | 10/1999 | Wier | B60R 22/3413 280/805 |
| 6,105,893 A | 8/2000 | Schmidt et al. | |
| 6,499,554 B1 * | 12/2002 | Yano | B60R 22/46 297/480 |
| 9,038,935 B2 * | 5/2015 | Stroik, Jr. | B60R 22/341 280/806 |
| 9,555,766 B2 | 1/2017 | Yamamoto | |
| 2002/0113424 A1 * | 8/2002 | Smith, Jr. | B60R 22/3413 280/806 |
| 2003/0192975 A1 * | 10/2003 | Palliser | B60R 22/3413 242/379.1 |

(Continued)

FOREIGN PATENT DOCUMENTS

| | | |
|---|---|---|
| CN | 212073957 U | 12/2020 |
| CN | 113183915 A | 7/2021 |
| WO | 2008149698 A1 | 12/2008 |

*Primary Examiner* — Anna M Momper
*Assistant Examiner* — Ermia E. Melika
(74) *Attorney, Agent, or Firm* — Frank A. MacKenzie; Brooks Kushman P.C.

(57) ABSTRACT

A seatbelt retractor includes a frame and a spool having a first end and a second end each rotatably supported by the frame. The spool is elongated on an axis from the first end to the second end. The seatbelt retractor includes a plurality of torsion posts fixed to the frame. The seatbelt retractor includes a locking device operatively coupled between the spool and the plurality of torsion posts.

19 Claims, 6 Drawing Sheets

(56) References Cited

U.S. PATENT DOCUMENTS

| | | | |
|---|---|---|---|
| 2005/0284978 A1* | 12/2005 | Zolkower | B60R 22/3413 242/379.1 |
| 2006/0022447 A1* | 2/2006 | Kohlndorfer | B60R 22/3413 280/805 |
| 2006/0076448 A1* | 4/2006 | Bell | B60R 22/3413 242/382 |
| 2018/0037191 A1* | 2/2018 | Franz | B60R 22/4633 |

* cited by examiner

LOAD LIMITING SEATBELT RETRACTOR

BACKGROUND

A seatbelt in a vehicle may be equipped with load-limiting features. During a vehicle impact, a retractor of the seatbelt may lock webbing of the seatbelt from further extension from the retractor, and load-limiting features may permit some additional limited extension of the webbing when the force exerted on the webbing exceeds a load-limiting threshold. This additional extension of the webbing from the retractor limits the load applied by the webbing to the chest of an occupant, which may limit chest compression. The load-limiting features typically include a torsion bar disposed within a spool of the retractor.

DETAILED DESCRIPTION

Figure 1:
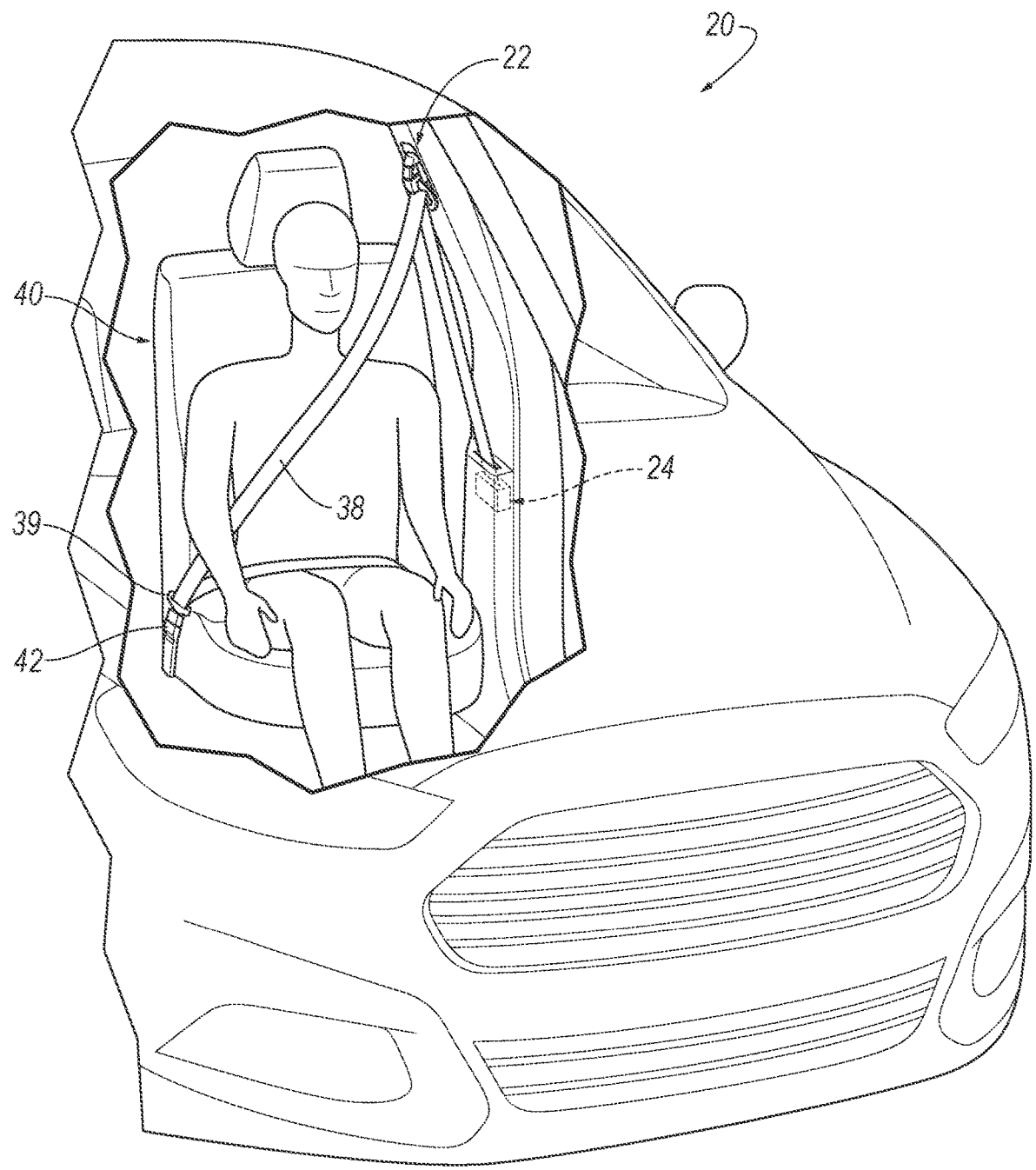
FIG. 1 is a perspective view of a vehicle including a seatbelt assembly.

A seatbelt retractor includes a frame and a spool having a first end and a second end each rotatably supported by the frame. The spool is elongated on an axis from the first end to the second end. The seatbelt retractor includes a plurality of torsion posts fixed to the frame. The seatbelt retractor includes a locking device operatively coupled between the spool and the plurality of torsion posts.

The plurality of torsion post may include a first torsion post having a first torsional strength and second torsion post having a second torsional strength less than the first torsional strength.

The plurality of torsion posts may include a first torsion post with a first diameter and a second torsion post with a second diameter smaller than the first diameter.

The plurality of torsion posts may include a first torsion post with a first necked portion.

The plurality of torsion posts may include a second torsion post with a second necked portion having a smaller diameter than the first necked portion.

The plurality of torsion posts may include a first torsion post that is hollow and defines a first wall thickness.

The plurality of torsion posts may include a second torsion post that is hollow and defines a second wall thickness that is less than the first wall thickness.

The seatbelt retractor may include a sun gear rotatably supported by the frame and a plurality of planetary gears fixed to the plurality of torsion posts, the locking device engageable with the sun gear.

The locking device may include an inertia clutch supported by the spool and engageable with the sun gear.

The plurality of planetary gears and the plurality of torsion posts may be unitary.

The plurality of planetary gears may be spaced from the frame along the axis.

The plurality of torsion posts may include a first torsion post with a first diameter defined between the plurality of planetary gears and the frame and a second torsion post with a second diameter defined between the plurality of planetary gears and the frame, the second diameter may be smaller than the first diameter.

The plurality of torsion posts may include a first torsion post with a first necked portion between the plurality of planetary gears and the frame.

The plurality of torsion posts may include a second torsion post with a second necked portion between the plurality of planetary gears and the frame, the second necked portion having a smaller diameter than the first necked portion.

The plurality of torsion posts may be spaced from each other circumferentially about the axis.

The seatbelt retractor may include a webbing wound around the spool.

The seatbelt retractor may include a return spring supported by the frame and operatively engaged with the spool.

The spool may be between the return spring and the locking device.

The spool may be free of having a torsion bar therein.

With reference to the Figures, wherein like numerals indicate like parts throughout the several views, a vehicle 20 with a seatbelt assembly 22 is shown. The seatbelt assembly 22 includes a seatbelt retractor 24 with a frame 26 and a spool 28 having a first end 30 and a second end 32 each rotatably supported by the frame 26. The spool 28 is elongated on an axis A1 from the first end 30 to the second end 32. The seatbelt retractor 24 includes a plurality of torsion posts 34a, 34b, 34c, 34d fixed to the frame 26. The seatbelt retractor 24 includes a locking device 36 operatively coupled between the spool 28 and the plurality of torsion posts 34a, 34b, 34c, 34d. When a certain load is applied, e.g., to a webbing 38 of the seatbelt assembly 22, the torsion posts 34a, 34b, 34c, 34d may plasticly deform and provide regulated payout of the webbing 38 from the seatbelt retractor 24.

With reference to FIG. 1, the vehicle 20 may be any suitable type of ground vehicle, e.g., a passenger or commercial automobile such as a sedan, a coupe, a truck, a sport utility, a crossover, a van, a minivan, a taxi, a bus, etc.

The vehicle 20 includes a frame and a body (not numbered). The body may be of unitary construction, in which the frame is unitary with the body including frame rails, rockers, pillars, roof rails, etc. As another example, the body and frame may have a body-on-frame construction (also referred to as a cab-on-frame construction) in which the body (including rockers, pillars, roof rails, etc.) and frame are separate components, i.e., are modular, and the body is supported on and affixed to the frame. Alternatively, the frame and body may have any suitable construction. The frame and the body may be of any suitable material, for example, steel, aluminum, and/or fiber-reinforced plastic, etc. The frame and/or the body defines a passenger compartment (not numbered) to house occupants, if any, of the vehicle 20. The passenger compartment may extend across the vehicle 20, i.e., from one side to the other side of the vehicle 20. The passenger compartment includes a front and a rear. The passenger compartment includes one or more seats 40. The seats 40 may be arranged in any suitable manner in the passenger compartment. The seats 40 may be of any suitable type, e.g., a bucket seat as shown in the Figures.

The vehicle 20 includes one or more seatbelt assemblies 22. The seatbelt assembly 22 includes the seatbelt retractor 24 and the webbing 38 extendable from the seatbelt retractor 24. The seatbelt assembly 22 may include an anchor (not shown) coupled to the webbing 38, and a clip 39 that engages a buckle 42. The seatbelt assembly 22 may be disposed adjacent the seat 40. For example, the seatbelt assembly 22 may be adjacent the front seat 40. The seatbelt assembly 22, when fastened, is designed to control the kinematics of the occupant during a collision or a sudden stop. The seatbelt assembly 22 may be a three-point harness, meaning that the webbing 38 is attached at three points around the occupant when fastened. The seatbelt assembly 22 may, alternatively, include another arrangement of attachment points.

The webbing 38 may extend continuously from the seatbelt retractor 24 to the anchor. For example, one end of the webbing 38 feeds into the seatbelt retractor 24, and the other end of the webbing 38 is fixed to the anchor. The anchor may, for example, be fixed to the seat 40. Alternatively, the anchor may be fixed to the vehicle body, e.g., the B-pillar, the floor, etc. The anchor may be attached to the seat 40 in any suitable manner, e.g., with fasteners. The webbing 38 may be wound around the spool 28. The webbing 38 may be fabric, e.g., polyester. The clip 39 slides freely along the webbing 38 and, when engaged with the buckle 42, divides the webbing 38 into a lap band and a shoulder band.

The seatbelt retractor 24 provides payout and retraction of the webbing 38, e.g., via rotation of the spool 28 in one direction or another. As described above, the seatbelt retractor 24 includes the frame 26. The frame 26 supports other components of the seatbelt retractor 24. The frame 26 may include a first plate 44 and a second plate 46 spaced from the first plate 44 along the axis A1. The frame 26 may be of any suitable size and shape. The frame 26 may be of any suitable material, e.g., plastic, metal, composite, etc. The seatbelt retractor 24 may be supported at any suitable location in the vehicle 20.

The spool 28 is rotatably supported by the frame 26. The first end 30 of the spool 28 is rotatably supported by, e.g., the first plate 44 of the frame 26. The second end 32 of the spool 28 is rotatably supported by, e.g., the second plate 46 of the frame 26. The spool 28 is elongated on the axis A1 from the first end 30 to the second end 32. The spool 28 is rotatable about the axis A1. For example, the first end 30 of the spool 28 may be supported in an opening defined by the first plate 44 and the second end 32 may be supported in a opening defined by the second plate 46.

Figure 2:
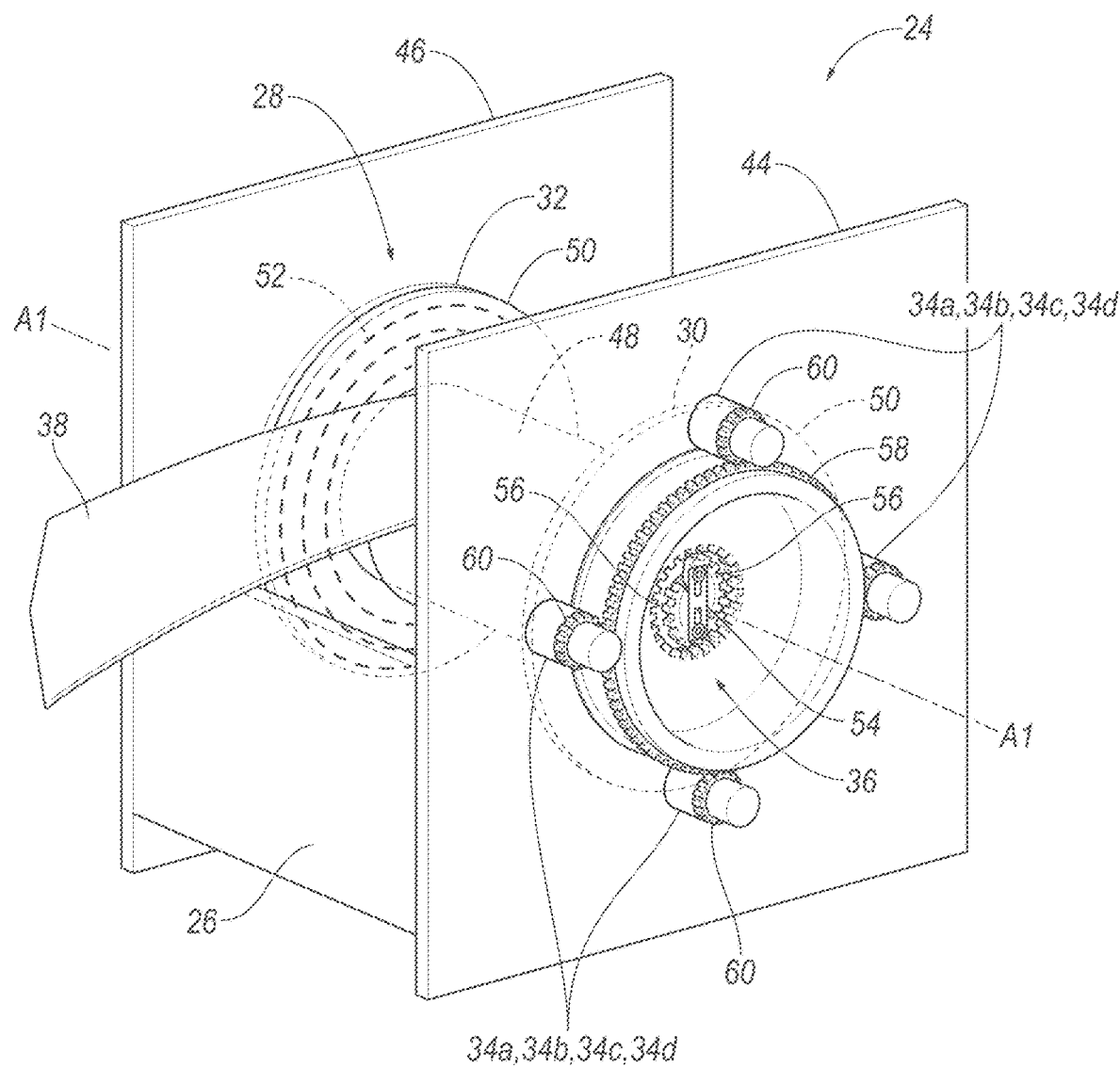
FIG. 2 is a perspective view of a seatbelt retractor in an unlocked position.
Figure 3:
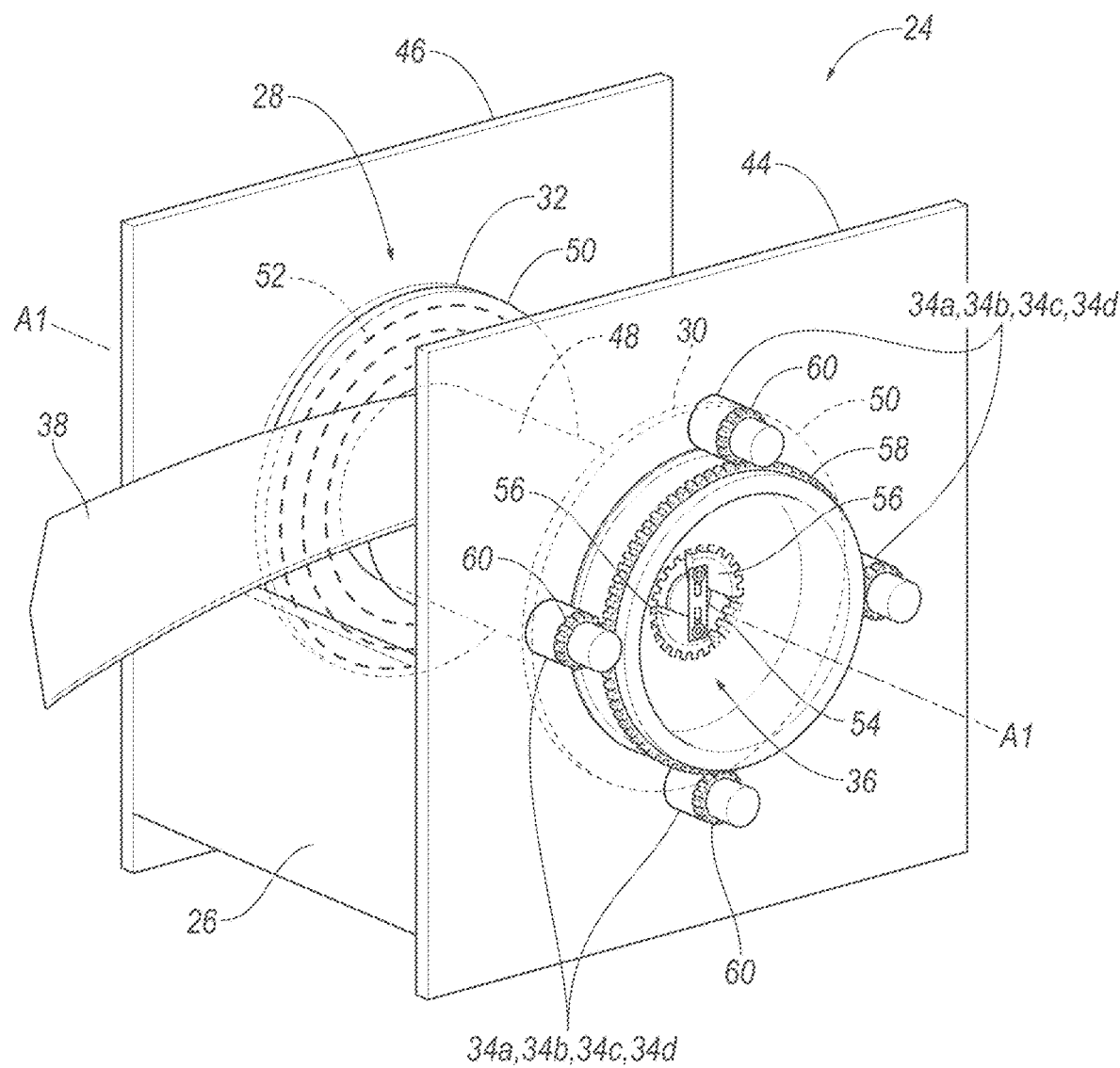
FIG. 3 is a perspective view of the seatbelt retractor in a locked position.

With reference to FIGS. 2 and 3, the spool 28 may include a cylinder 48 and two flanges 50. The cylinder 48 may be elongated along the axis A1 between the first end 30 and the second end 32. As an example, shown in the Figures, the spool 28 includes one flange 50 at the first end 30 of the spool 28 and the other flange 50 at the second end 32 of the spool 28. The cylinder 48 is elongated from one flange 50 to the other flange 50. The flanges 50 maintain the position of the webbing 38 relative to the spool 28, i.e., the webbing 38 is between the flanges 50. As shown in the Figures the flanges 50 extend radially away from the axis A1. The spool 28 may be free of having a torsion bar therein, e.g., at least because the torsion posts 34a, 34b, 34c, 34d external of the spool 28 may control rotation of the spool 28. In other words, the seatbelt retractor 24 may not include a conventional torsion bar connecting the locking device 36 to the spool 28.

The webbing 38 is supported by the spool 28. Specifically, the webbing 38 is supported on the cylinder 48 between the two flanges 50. The cylinder 48 includes a slot elongated along the axis A1. The slot is sized and shaped to receive the webbing 38. The webbing 38 may be in the slot and wound around the spool 28. The webbing 38 may be, for example, fixed to the spool 28 through the slot. The webbing 38 may be fixed to the spool 28 in any suitable manner.

The seatbelt retractor 24 includes a return spring 52. The return spring 52 supported by the frame 26 and operatively engaged with the spool 28 to apply torque to the spool 28 relative to the frame 26. The return spring 52 may be coupled to the spool 28 and the frame 26. In the example shown in FIGS. 2 and 3, the return spring 52 is disposed at the first plate 44 of the frame 26 and is engaged with the first end 30 of the spool 28 to retract the webbing 38. The return spring 52 may be loaded in tension or compression when the webbing 38 is fully retracted, and the return spring 52 may be further loaded in either tension or compression when the webbing 38 is extended from the spool 28. When force is exerted on the webbing 38, the return spring 52 may uncoil and the webbing 38 may payout from the spool 28. When the force applied to the webbing 38 is released, no rotational force is exerted on the spool 28 and the return spring 52 exerts a force tending to retract the webbing 38. The return spring 52 may be, for example, a spiral torsion return spring 52 or any other suitable type of return spring 52.

The seatbelt retractor 24 includes the locking device 36 operatively coupled between the spool 28 and the plurality of torsion posts 34a, 34b, 34c, 34d to control movement of the spool 28 relative to the torsion posts 34a, 34b, 34c, 34d. As shown in FIG. 2, the locking device 36 is supported at the second end 32 of the spool 28 and the second plate 46 of the frame 26. The spool 28 may between the return spring 52 and the locking device 36 along the axis A1. The locking device 36 is movable from an unlocked position, shown in FIG. 2, in which torque is not transferred from the spool 28 to the plurality of torsion posts 34a, 34b, 34c, 34d to a locked position, shown in FIG. 3, is which torque is transferred from the spool 28 to the plurality of torsion posts 34a, 34b, 34c, 34d.

The locking device 36 may include an inertia clutch 54 that move the locking device 36 from the unlocked position to the locked position in response to a vehicle deceleration of the inertia clutch 54 from deceleration of the vehicle 20. The inertia clutch 54 may be supported by the spool 28. For example, the inertia clutch 54 may include one or more pawls 56 supported at the second end 32 of the spool 28. Centrifugal force from an increase in rotation speed of the spool 28, e.g., when a certain load is applied to the webbing 38, may urge the pawls 56 radial outward to the locked position. As another example, the locking device 36 may be moved from the unlocked position to the locked position in response to deceleration of the vehicle 20, e.g., a sudden slowing of the vehicle 20, sudden stop, impact, etc., of the vehicle 20. The locking device 36 may be moved from the unlocked position to the locked position in response to an activation sensor (not shown). The activation sensor senses sudden deceleration of the vehicle 20 and triggers activation of the locking device 36, i.e., moves the locking device 36 to the locked position. The locking device 36 may include any suitable structure for selectively transferring torque, e.g., including conventional structures.

The seatbelt retractor 24 may include a sun gear 58 rotatably supported by the frame 26 and a plurality of planetary gears 60 fixed to the plurality of torsion posts 34a, 34b, 34c, 34d. The sun gear 58 and the planetary gears 60 are included in the seatbelt retractor 24 to transfer torque from the spool 28 to the torsion posts 34a, 34b, 34c, 34d. The sun gear 58 may be rotatably supported by the second plate 46 of the frame 26, including being rotatably supported by the second end 32 of the spool 28 at the second plate 46. The plurality of planetary gears 60 may be fixed to the plurality of torsion posts 34a, 34b, 34c, 34d, e.g., via weld, press fit, fastener, spline, or any suitable structure. The plurality of planetary gears 60 and the plurality of torsion posts 34a, 34b, 34c, 34d may be unitary. In other words, the of torsion posts 34a, 34b, 34c, 34d and the respective planetary gears 60 may be each be a single, uniform piece of material with no seams, joints, fasteners, or adhesives holding them to each other, i.e., are formed together simultaneously as a single continuous unit. The plurality of planetary gears 60 may be spaced from the frame 26 along the axis A1. For example, the planetary gears 60 may be fixed to distal ends of the torsion posts 34a, 34b, 34c, 34d. The plurality of planetary gears 60 be spaced from each other circumferentially about the sun gear 58. Teeth (not numbered) of the sun gear 58 and the planetary gears 60 may be meshed.

The locking device 36 may be engageable with the sun gear 58. In other words, the locking device 36 in the unlocked position may not transfer torque from the spool 28 to the sun gear 58, and in the locked position may transfer torque from the spool 28 to the sun gear 58. The inertia clutch 54 may be engageable with the sun gear 58. For example, in the unlocked position the pawls 56 may be disengaged from sun gear 58 and in the locked position the pawls 56 may be engaged with the sun gear 58. Teeth (not numbered) of the sun gear 58 and the pawls 56 may be meshed when the pawls 56 are engaged with the sun gear 58.

The plurality of torsion posts 34a, 34b, 34c, 34d may deform to control payout of the webbing 38, e.g., when the locking device 36 is at the locked position and sufficient load is applied to the webbing 38. The plurality of torsion posts 34a, 34b, 34c, 34d are fixed to the frame 26, e.g., to the second plate 46. The torsion posts 34a, 34b, 34c, 34d may be fixed to the frame 26 via weld, fastener, or any suitable structure. The torsion posts 34a, 34b, 34c, 34d and the frame 26 may be unitary. The torsion post 34a, 34b, 34c, 34d may extend away from the frame 26 and the spool 28 along the axis A1. The plurality of torsion posts 34a, 34b, 34c, 34d may be spaced from each other circumferentially about the axis A1, e.g., surrounding the sun gear 58. The torsion posts 34a, 34b, 34c, 34d may be equally spaced about the axis A1, e.g., with 90 degrees separating adjacent torsion posts 34a, 34b, 34c, 34d. The seatbelt retractor 24 may include more or less torsion posts 34a, 34b, 34c, 34d than shown.

The torsion posts 34a, 34b, 34c, 34d may have different torsional strengths relative to each other. For example, the plurality of torsion posts 34a, 34b, 34c, 34d may include a first torsion post 34a, 34c having a first torsional strength and second torsion post 34b, 34d having a second torsional strength less than the first torsional strength. The different torsional strengths may be provided, for example, by the torsion posts 34a, 34b, 34c, 34d having different material and/or different geometry than each other.

Figure 4:
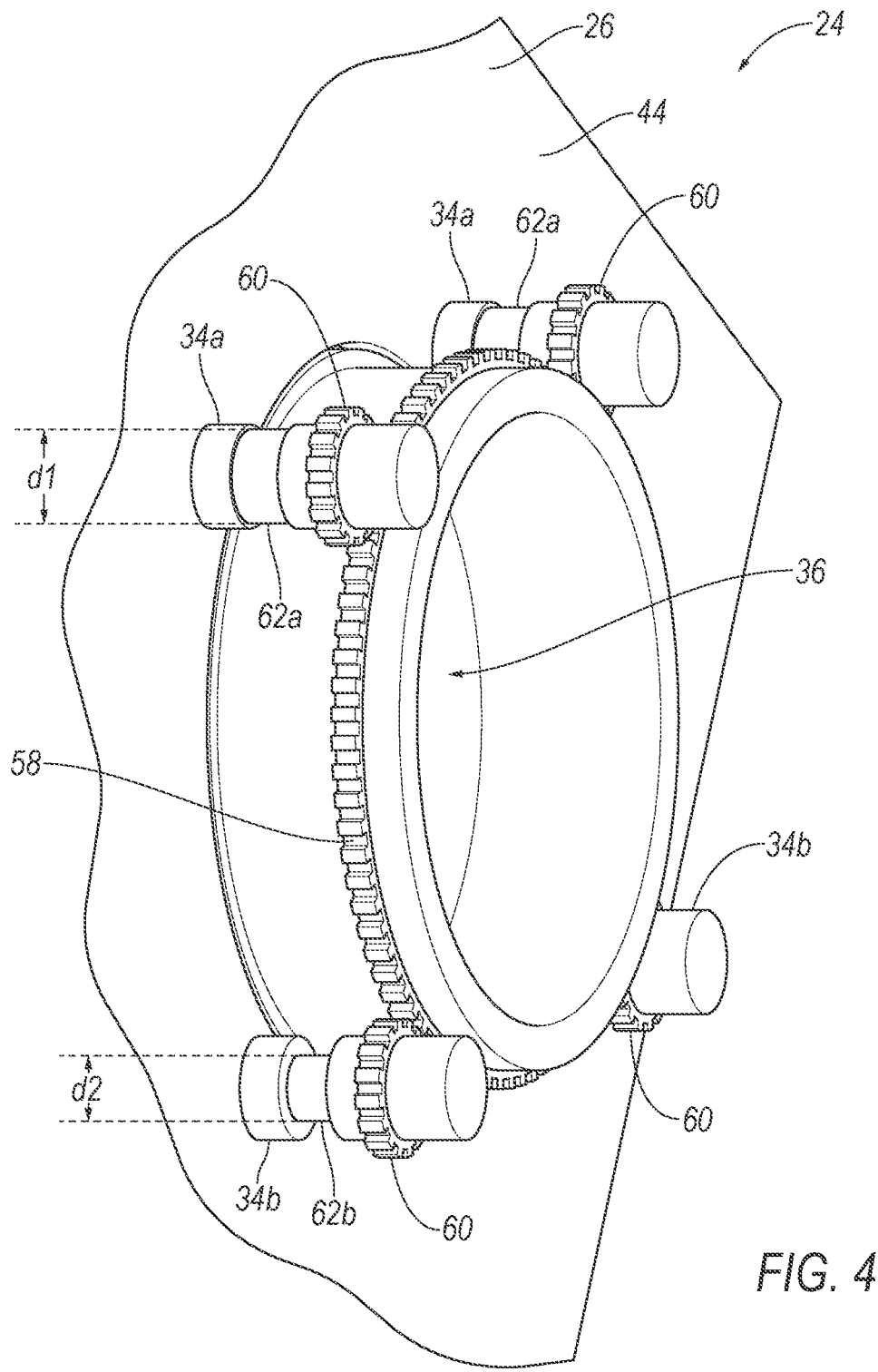
FIG. 4 is a perspective view of a portion of one example of the seatbelt retractor.

With reference to FIG. 4, the plurality of torsion posts 34a, 34b may include one or more first torsion post 34a with a first diameter D1 and one or more second torsion post 34b with a second diameter D2 smaller than the first diameter D1. The second diameter D2 smaller than the first diameter D1 provides decreased torsional strength to the second torsion post 34b relative to the first torsion post 34a. The first diameter D1 is defined between the plurality of planetary gears 60 and the frame 26 along the first torsion post 34a. The second diameter D2 is defined between the plurality of planetary gears 60 and the frame 26 along the second torsion post 34b. For example, the first torsion post 34a may include a first necked portion 62a defining the first diameter D1 and the second torsion post 34b may include a second necked portion 62b defining the second diameter D2. Diameters D1, D2 defined by the torsion posts 34a, 34b are greater adjacent the necked portions 62a, 62b than at the necked portions 62a, 62b. In other words, the necked portions 62a, 62b include a localized decreased diameter of the torsion posts 34a, 34b. The first necked portion 62a may be between the plurality of planetary gears 60 and the frame 26 along the first torsion post 34a. The second necked portion 62b may be between the plurality of planetary gears 60 and the frame 26 along the second torsion post 34b. When torque is applied to the planetary gears 60 the torsion posts 34a, 34b may elasticity and/or plasticity deform at the necked portions 62a, 62b.

Figure 5:
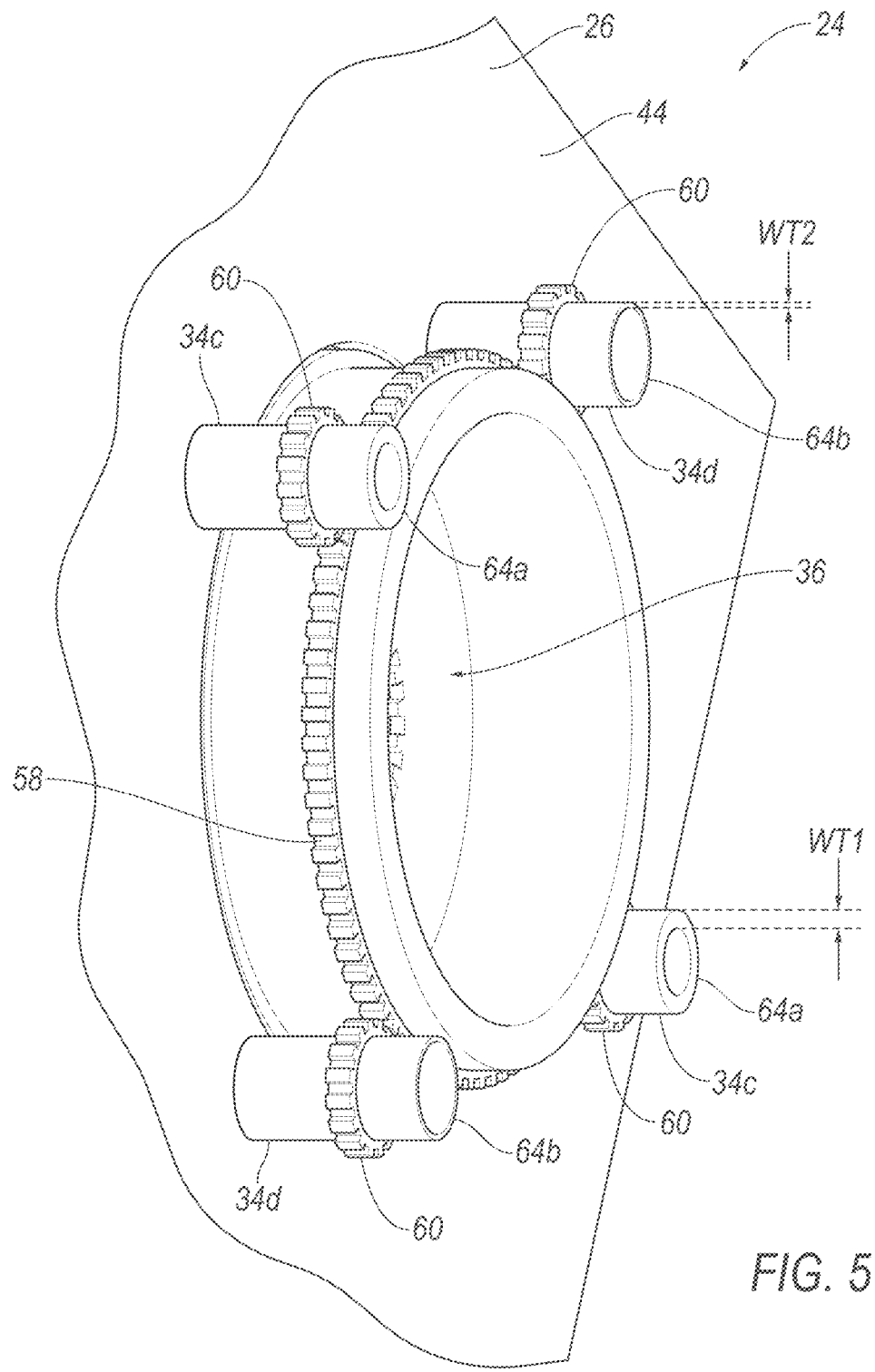
FIG. 5 is a perspective view of a portion of another example of the seatbelt retractor.

With reference to FIG. 5, the first torsion post 34c may include a hollow 64a and define a first wall thickness WT1, and the second torsion post 34d may include a hollow 64b and defines a second wall thickness WT2 than is less than the first wall thickness WT1. The second wall thickness WT2 smaller than the first wall thickness WT1 provides decreased torsional strength to the second torsion post 34d relative to the first torsion post 34c. The varied wall thickness and diameter of the torsion post 34c, 34d be used in combination to control torsion strength and deformation characteristics of the torsion posts. For example, one or more of the torsion posts may be both hollow and include a necked portion (not shown).

Figure 6:
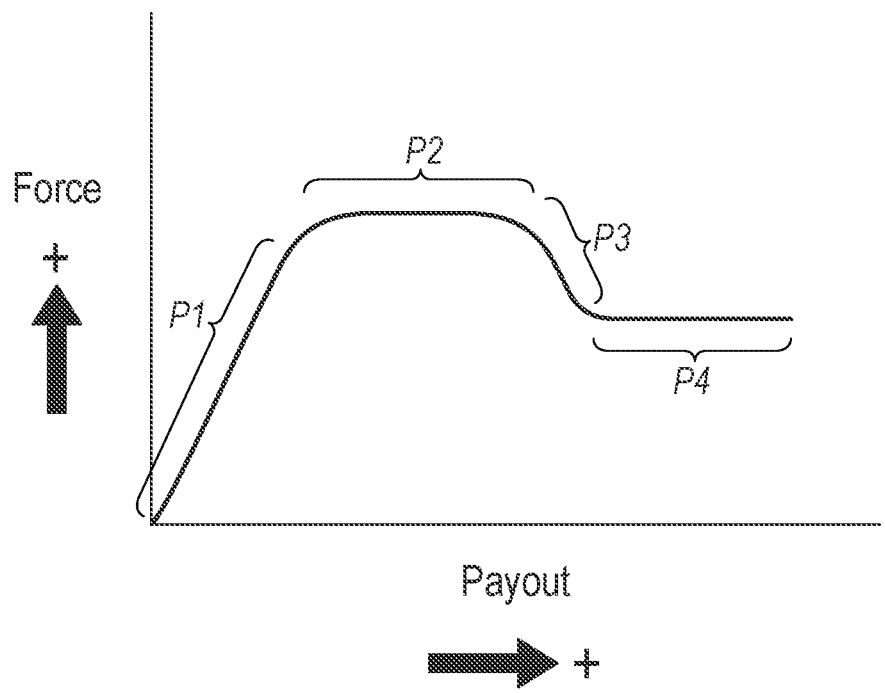
FIG. 6 is an illustration of a Force-Payout curve defined by the retractor.

The different torsional strengths affect payout of the webbing 38 from the seatbelt retractor 24 in response to force applied to the webbing 38 when the locking device 36 is in the locked position. For example, and with reference to FIG. 6, an example force-payout curve C is illustrated. At a portion P1 of the curve C increasing responsive force is provided by the torsion posts 34a, 34b, 34c, 34d as the webbing 38 is initially loaded, e.g., by an occupant of the vehicle 20, and one or more of the torsion posts 34a, 34b, 34c, 34d elastically deform. At a portion P2 of the curve C one or more of the torsion posts 34a, 34b, 34c, 34d plasticly deform and webbing 38 is permitted to payout while the retractor 24 provides a first amount of response force. At a portion P3 of the curve C one or more of the second torsion posts 34b, 34d with the relatively lower torsion strength shear or otherwise fracture and cease providing responsive force to the webbing 38. At a portion P4 of the curve C one or more remaining torsion posts 34a, 34b, 34c, 34d may plasticly deform and webbing 38 may be permitted to payout while the retractor 24 provides a second amount of response force less than the first amount at P1. The torsion posts 34a, 34b, 34c, 34d and the force-payout curve C may include more than two different torsional strengths and respective response forces. The curve C is shown as having a single force reduction at portion P3 followed by the generally consistent force at P4. The curve C may have additional force reductions and consistent force areas, e.g., in a downward step shape. Such additional force reductions and consistent force areas may be provided by additional torsion posts of various strengths (not shown).

The disclosure has been described in an illustrative manner, and it is to be understood that the terminology which has been used is intended to be in the nature of words of description rather than of limitation. Many modifications and variations of the present disclosure are possible in light of the above teachings, and the disclosure may be practiced otherwise than as specifically described.

The invention claimed is:

1. A seatbelt retractor comprising:
a frame;
a spool having a first end and a second end each rotatably supported by the frame, the spool being elongated on an axis from the first end to the second end;
a driving gear rotatably supported by the frame;
a locking device supported by the spool and engageable with the gear to rotationally lock the spool to the driving gear;
a plurality of torsion posts, each torsion post including a fixed end fixed to the frame and a free end spaced from the fixed end; and
a plurality of driven gears, each driven gear being rotationally fixed to a respective one of the torsion posts spaced from the fixed end of the respective one of the torsion posts;
each driven gear being engaged with the driving gear; and
the plurality of torsion posts being spaced from each other circumferentially about the driving gear.

2. The seatbelt retractor of claim 1, wherein the plurality of torsion posts includes a first torsion post having a first torsional strength and second torsion post having a second torsional strength less than the first torsional strength.

3. The seatbelt retractor of claim 1, wherein the plurality of torsion posts includes a first torsion post with a first diameter between the driven gear rotationally fixed to the first torsion post and the fixed end of the first torsion post, and a second torsion post with a second diameter between the driven gear rotationally fixed to the second torsion post and the fixed end of the second torsion post, the second diameter being smaller than the first diameter.

4. The seatbelt retractor of claim 1, wherein the plurality of torsion posts includes a first torsion post with a first necked portion a second torsion post with a second necked portion having a smaller diameter than the first necked portion.

5. The seatbelt retractor of claim 1, wherein the plurality of torsion posts includes a first torsion post that is hollow and defines a first wall thickness and a second torsion post that is hollow and defines a second wall thickness that is less than the first wall thickness.

6. The seatbelt retractor of claim 1, wherein the locking device includes an inertia clutch supported by the spool and engageable with the driving gear.

7. The seatbelt retractor of claim 1, wherein each driven gear is unitary with the respective one of the torsion posts.

8. The seatbelt retractor of claim 1, further comprising a webbing wound around the spool.

9. The seatbelt retractor of claim 1, further comprising a return spring supported by the frame and operatively engaged with the spool.

10. The seatbelt retractor of claim 9, wherein the spool is between the return spring and the locking device.

11. The seatbelt retractor of claim 1, wherein the spool is free of having a torsion bar therein.

12. A seatbelt retractor comprising:
a frame;
a spool having a first end and a second end each rotatably supported by the frame, the spool being elongated on an axis from the first end to the second end, the spool being rotatable about the axis;
a driving gear rotatably supported by the frame, the driving gear being rotatable about the axis;
a locking device supported by the spool and engageable with the gear to rotationally lock the spool to the driving gear for rotation about the axis;
a first torsion post and a second torsion post, the first torsion post and the second torsion post each including a fixed end fixed to the frame and a free end spaced from the fixed end along the axis;
a first driven gear rotationally fixed to the first torsion post spaced from the fixed end of the first torsion post, and a second driven gear rotationally fixed to the second torsion post spaced from the fixed end of the second torsion post;
first driven gear and the second driven gear being engaged with the driving gear and being spaced from each other circumferentially about the driving gear;
the first torsion post having a first torsional strength between the first gear and the fixed end of the first torsion post, and the second torsion post having a second torsional strength between the second gear and the fixed end of the second torsional post, the second torsional strength being less than the first torsional strength.

13. The seatbelt retractor of claim 12, further comprising:
a third torsion post including a fixed end fixed to the frame and a free end spaced from the fixed end along the axis;
a third driven gear rotationally fixed to the third torsion post spaced from the fixed end of the third torsion post;
the third driven gear being engaged with the driving gear;
the third torsion post having a third torsional strength between the third gear and the fixed end of the third torsion post, the third torsional strength being less than the first torsional strength and the second torsional strength.

14. The seatbelt retractor of claim 13, wherein the third torsion bar is spaced from the first torsion bar and the second torsion bar circumferentially about the driving gear.

15. The seatbelt retractor of claim 12, wherein the first torsion post has a first diameter between the first driven gear and the fixed end of the first torsion post, and the second torsion post has a second diameter between the second driven gear and the fixed end of the second torsion post, the second diameter being smaller than the first diameter.

16. The seatbelt retractor of claim 12, wherein the first torsion post has a first necked portion between the first driven gear and the first end of the first torsion post, and the second torsion post has a second necked portion between the second driven gear and the first end of the second torsion post, the second necked portion having a smaller diameter than the first necked portion.

17. The seatbelt retractor of claim 12, wherein the first torsion post is hollow and defines a first wall thickness between the first driven gear and the first end of the first torsion post, and the second torsion post is hollow and defines a second wall thickness between the second driven gear and the first end of the second torsion post, the second wall thickness being less than the first wall thickness.

18. The seatbelt retractor of claim 12, wherein the locking device includes an inertia clutch supported by the spool and engageable with the driving gear.

19. The seatbelt retractor of claim 12, further comprising a webbing wound around the spool.

* * * * *